United States Patent [19]

Sakagami et al.

[11] 4,443,366

[45] Apr. 17, 1984

[54] GEL CHROMATOGRAPHY MATERIAL

[75] Inventors: Teruo Sakagami; Noriyuki Arakawa; Naohiro Murayama, all of Iwaki, Japan

[73] Assignee: Kureha Kagaku Kogyo Kabushiki Kaisha, Tokyo, Japan

[21] Appl. No.: 363,401

[22] Filed: Mar. 29, 1982

Related U.S. Application Data

[62] Division of Ser. No. 169,462, Jul. 16, 1980, abandoned.

[30] Foreign Application Priority Data

Jul. 20, 1979 [JP] Japan .................................. 54-92337

[51] Int. Cl.³ ........................ C08F 226/10; C07G 7/00
[52] U.S. Cl. ................................ 260/112 R; 210/635; 260/112.5 R; 435/183; 435/815; 526/261
[58] Field of Search ................. 210/635; 260/112.5 R, 260/112 R; 526/261; 435/183, 815

[56] References Cited

U.S. PATENT DOCUMENTS

| | | | |
|---|---|---|---|
| 2,848,440 | 8/1958 | Davis | 526/261 |
| 3,298,925 | 1/1967 | Mosbach | 210/635 |
| 3,586,626 | 6/1971 | Heitz et al. | 210/635 |
| 3,657,117 | 4/1972 | Pfitzner et al. | 210/635 |
| 3,960,720 | 6/1976 | Porath et al. | 210/635 |
| 4,184,992 | 1/1980 | Hosaka | 526/261 |

Primary Examiner—Harry Wong, Jr.
Attorney, Agent, or Firm—Oblon, Fisher, Spivak, McClelland & Maier

[57] ABSTRACT

A mixture of water-soluble substances, particularly a mixture of proteins, a mixture of enzymes or a mixture of water-soluble vitamins, is fractionated by subjecting an aqueous solution of said mixture of water-soluble substances to gel chromatography through a filter bed of a cross-linked gel copolymer of vinylpyrrolidone and a cross-linking agent having a triazine ring system of the formula (I) or (II):

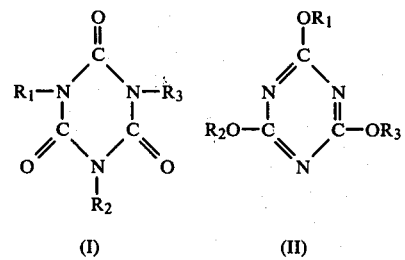

wherein $R^1$, $R^2$ and $R^3$ are the same or different and each radical is selected from the group consisting of $-CH_2-CH=CH_2$, $-CH_2-C\equiv CH$ and $-CH_2-C(CH)_2$, in a diluent.

2 Claims, 2 Drawing Figures

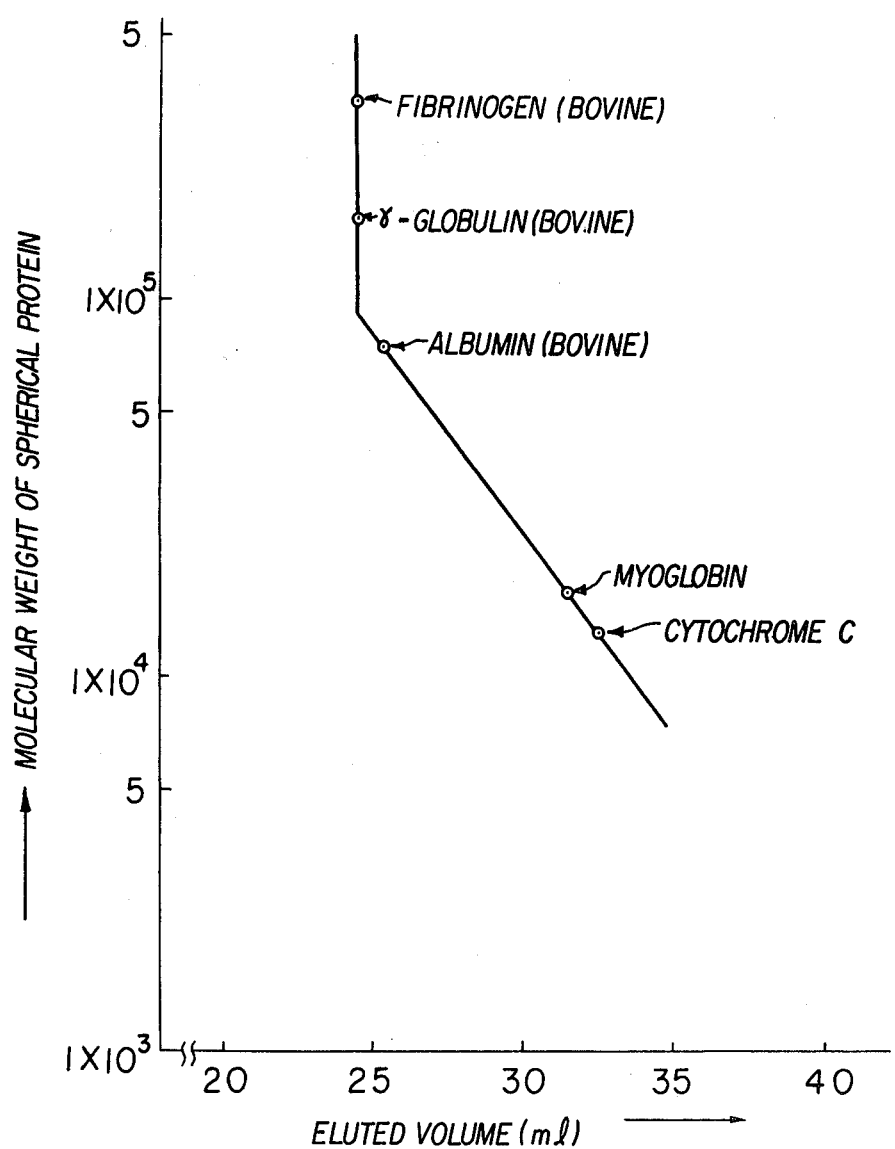
F I G. 2

GEL CHROMATOGRAPHY MATERIAL

This is a division of application Ser. No. 169,462, filed July 16, 1980, now abandoned.

BACKGROUND OF THE INVENTION

1. Field of the Invention

The present invention relates to a copolymeric gel for use in gel chromatography which is obtained by copolymerizing vinyl pyrrolidone and a trifunctional crosslinking agent having a triazine ring.

2. Description of the Prior Arts

It has been known to use the following substrates for a separation, purification and desalting of proteins.

(1) Natural polymers obtained by dextrane, cellulose, starch and derivatives thereof;

(2) Synthetic polymers such as polyacrylamide, polymethacrylic acid, maleic anhydride-ethylene copolymer, polyvinyl alcohol, and polystyrene modified resin;

(3) Inorganic substrates such as porous glass, activated carbon, alumina and acid clay.

In view of superior separation and purification of proteins, safety and non-adsorbability, a crosslinked dextran such as Sephadex (manufactured by Pharmacia Co.) agarose such as Sephalose as natural products and derivatives thereof, have been mainly used. These substrates are obtained from natural products, however, have usually inferior mechanical strength to the synthetic polymer (2) or the inorganic substrate (3). It has been well-known that the substrates do not impart satisfactory characteristics because of the crushing or compression of the substrate when these substrates are industrially used in a high water content region. Moreover, a resistivity to an acid or a base is not usually satisfactory.

Although the inorganic substrates exhibit excellent mechanical strength, they are not very hydrophilic. Moreover, the inorganic substrates could not be used in the fractionation of proteins because the inorganic substrates are specifically adsorptive to proteins which are used in aqueous solutions.

The synthetic polymers (2) have properties between the natural products and the inorganic substrates. Any synthetic polymer having satisfactory characteristics of the fractioning function, hydrophilic property, mechanical strength, safety, acid resistance, alkali resistance and non-specific adsorbability, has not been found. Although various disadvantages have been found, the natural products (1) have been used as the substrates.

SUMMARY OF THE INVENTION

It is an object of the present invention to provide a copolymeric gel for use in gel chromatography which has satisfactory characteristics of fractioning function, hydrophilic property, mechanical strength, safety, acid resistance, alkali resistance, and non-specific adsorbability.

The foregoing and other objects of the present invention have been attained by providing a crosslinked polyvinyl pyrrolidone gel which is obtained by copolymerizing 100 wt.parts of vinyl pyrrolidone and 0.5 to 100 wt.parts of a crosslinking agent having a triazine ring of the formula (I) or (II).

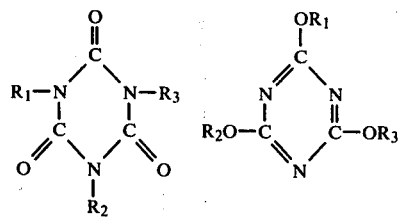

wherein $R_1$, $R_2$ and $R_3$ are respectively the same or different and selected from the group consisting of $-CH_2-CH=CH_2$, $-CH_2-C\equiv CH$ and

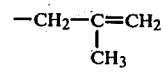

in a diluent.

BRIEF DESCRIPTION OF THE DRAWINGS

FIG. 2 shows the elution curve of proteins with the vinyl pyrrolidone-triallyl isocyanurate copolymer obtained by the process of Example 2.

DETAILED DESCRIPTION OF THE PREFERRED EMBODIMENTS

Figure 1:
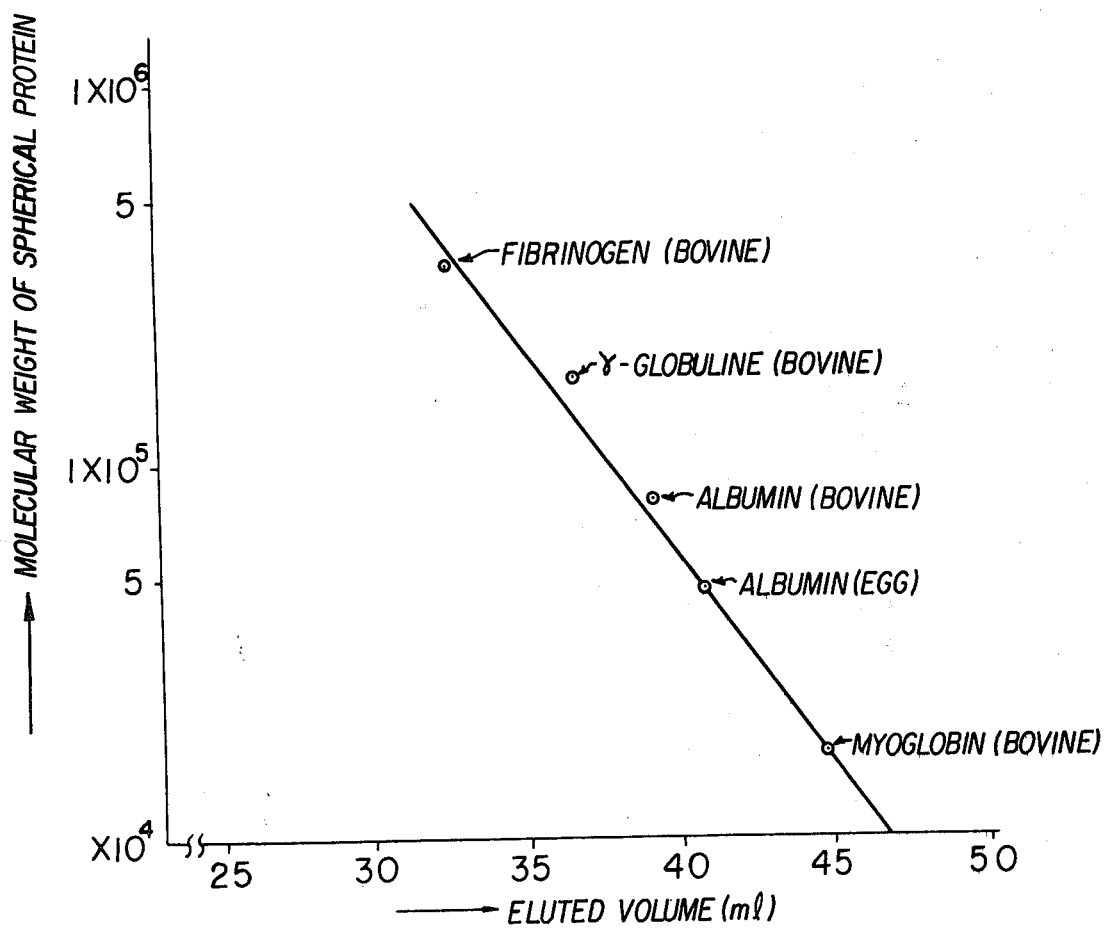
FIG. 1 shows the elution curve of proteins with the vinyl pyrrolidone-triallyl isocyanurate copolymer gel obtained by the process of Example 1.

The gel of the present invention is made of a copolymer of vinyl pyrrolidone and a trifunctional crosslinking agent having a triazine ring.

Polyvinyl pyrrolidone has excellent hydrophilic property as well-known, to be easily soluble in water at the ambient temperature and it is suitable for a hydrophilic gel for filtering fractionation. Polyvinyl pyrrolidone has high heat resistance to be stable even by heating it at 100° C. for 16 hours and has low toxicity as it is used for blood substitute. Moreover, it can be sterilized at high temperature to be remarkably effective as a substrate for a gel for chromatography of enzymes and various proteins which will be administrated to humanbody.

The trifunctional crosslinking agent having triazine ring used in the present invention can be easily copolymerized with vinyl pyrrolidone at any desired ratio to obtain a copolymer having a complete crosslinked structure and excellent mechanical strength.

The crosslinking agent having a triazine ring is remarkably stable to an acid or a base and maintains the original crosslinking structure even in an acid or a base.

On the other hand, acryl ester type crosslinking agents which are usually used for crosslinking vinyl pyrrolidone such as diethyleneglycol dimethacrylate, are easily hydrolyzed with an acid or a base to change the crosslinked structure and to form carboxyl group having function for adsorption of proteins, in the copolymer after the hydrolysis so as to impart a special elution behavior in a fractionation of ionic materials. Therefore, it is not suitable to copolymerize such crosslinking agent at a high ratio in the copolymerization.

In the copolymerization of vinyl pyrrolidone and a crosslinking agent having a triazine ring, vinyl pyrrolidone and the crosslinking agent are gelated with water and/or an organic solvent as a diluent so as to form desired fine pores. As described in the following examples, desired fine pores for the fractionation of proteins can be formed. As described above, the gel chromatography material of the present invention has excellent characteristics for fraction of proteins and has hydrophilic property and excellent acid resistance and alkali resistance and mechanical strength and it is suitable for the filtering fractionation purification and desaltation of proteins, enzymes and various vitamines.

The present invention will be further illustrated.

The trifunctional crosslinking agents having a triazine ring which is copolymerized with vinyl pyrrolidone having the following formula (I) or (II).

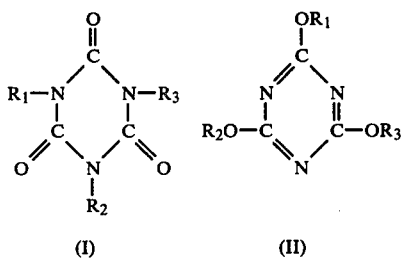

wherein $R_1$, $R_2$ and $R_3$ are respectively the same or different and selected from the group consisting of $-CH_2-CH=CH_2$, $-CH_2-C\equiv CH$ and

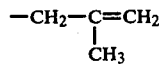

in a diluent.

The compound having the formula (I) wherein $R_1$, $R_2$ and $R_3$ are respectively $-CH_2-CH=CH_2$ as triallyl isocyanurate is easily available and has excellent heat resistance and acid and alkali resistance to be the useful crosslinking agent among the crosslinking agents in the definition.

The other typical crosslinking agents include triallyl cyanurate and diallyl propargyl cyanurate.

A ratio of the trifunctional crosslinking agent having a triazine ring such as triallyl isocyanurate to vinyl pyrrolidone is depending upon a quantity of the diluent incorporated in the copolymerization which corresponds to a desired porosity of the gel and it is usual to use 0.2 to 100 wt.parts of the crosslinking agent to 100 wt. parts of vinyl pyrrolidone.

When it is more than 100 wt.parts, a ratio of vinyl pyrrolidone component is lower to cause lower hydrophilic property of the copolymer. This is not suitable for the fraction using an aqueous solution as an eluent. When it is less than 0.2 wt. part, the crosslinked structure is too weak and the mechanical strength is too low.

In a system having a high ratio of the diluent, it is necessary to incorporate the crosslinking agent at high ratio so as to impart a desired mechanical strength. It is necessary to consider the balance of the strength, the hydrophilic property and the fine pores of the gel. Therefore, it is preferable to use 0.8 to 80 wt. parts of the crosslinking agent to 100 wt. parts of vinyl pyrrolidone.

The trifunctional crosslinking agent having a triazine ring such as triallyl isocyanurate and vinyl pyrrolidone have remarkably high radical copolymerizability to form easily a gel having the crosslinked structure by the conventional solution radical polymerization in a diluent or the conventional suspension polymerization with a diluent. When water is the diluent, the monomers and the crosslinking agent are dissolved in water and the suspension polymerization is carried out in a solvent such as hexane.

The initiator for the copolymerization is not critical and can be the conventional radical catalysts such as hydrogen peroxideammonia, potassium persulfate, ammonium persulfate, diisopropyl benzene hydroperoxide, benzoyl peroxide, lauroyl peroxide, $\alpha,\alpha'$-azodiisobutyronitrile etc.

The diluent should uniformly dissolve vinyl pyrrolidone and the crosslinking agent. Suitable diluents include water, alcohols such as methanol, dimethylsulfoxide, ethyl acetate, tetrahydrofuran, dimethylformamide and dimethylacetamide as hydrophilic organic solvents.

The fine pores of the gel suitable for the desired filtering fractionation can be formed by controlling the ratios of a total of vinyl pyrrolidone and the crosslinking agent to water and the organic solvent.

The diluent is usually incorporated at a ratio of 50 to 2000 wt. parts per 100 wt. parts of the total of vinyl pyrrolidone and the crosslinking agent.

The copolymerization is usually carried out at a temperature from a boiling point of the diluent to 0° C. preferably 20° to 100° C. for a time forming a desired gel.

As described above, in accordance with the present invention a copolymeric gel for use in gel chromatography is suitable for the filtering fractionation of an aqueous solution of protein and has excellent fractioning function, hydrophilic property, strength, safety, acid resistance and alkali resistance and has not any adsorbability of proteins. Therefore, the gel of the present invention is superior to the natural substrate for fractionation.

The present invention will be further illustrated by certain examples and references which are provided for purposes of illustration only and are not intended to be limiting the present invention.

EXAMPLE 1

In a reactor, 10 wt.parts of pure vinyl pyrrolidone and 3 wt.parts of triallyl isocyanurate were dissolved in 100 wt.parts of dimethylsulfoxide and the mixture was thoroughly mixed and 0.3 wt. part of $\alpha,\alpha'$-azodiisobutyronitrile was added and the reactor was purged with nitrogen and the mixture was stirred by a magnetic stirrer for 5 minutes. The mixture was heated to 60° C. After about two hours, the system was gradually changed to be opaque. The stirring was stopped and the system was kept in stand-still at the temperature for 3 hours and then, the system was heated to 75° C. and was kept in standstill at the temperature for 16 hours. The system was completely solidified to obtain an opaque hard gel. The gel was pulverized into large particles. Dimethylsulfoxide was substituted with a large amount of methanol until removing smell of dimethylsulfoxide and then, methanol was substituted with a large amount of water. The product was placed on a stainless steel gauze having 28 mesh and was pulverized into fine particles under pressure. The pulverized vinyl pyrrolidone triallyl isocyanurate copolymer gel was charged into a boiled water at about 100° C. and kept it for 30 hours to remove the solvent.

The product was packed into a glass chromatography column having an inner diameter of 1.6 cm to be a height of the bed of 27.5 cm (a volume of the bed of about 55.3 cm$^3$) and various standard proteins were separated into fractions with 1/30 Mol phosphoric acid buffer solution (pH of 7.0) as an eluent.

FIG. 1 shows a characteristic curve of eluted volume to molecular weight.

It was clarified that the critical molecular weight of the protein by the vinyl pyrrolidone triallyl isocyanurate copolymer obtained in Example 1 was higher than about $4 \times 10^5$.

A speed of an elution in the column was 68 cc/hr. In these tests, 1 ml. of 0.1% aqueous solution of each protein was mostly used.

A water content of the gel was 4.8 g./water/g.dry resin. The water content was measured by filtering a wet gel with a 400 mesh gauze and the gel with the gauze was treated by a centrifugal separator at 1500 rpm and a weight was measured and then, the gel was dried in a Geer's oven at 105° C. to be a constant weight. The water content per unit of the dry gel was calculated from the weight difference.

A shrinkage of the gel in 15% aqueous solution of NaCl was measured to be about 6%.

The shrinkage in 15 wt.% NaCl aq. was calculated by the following equation.

$$S(\%) = \frac{W_o - \left(\frac{W}{\rho}\right)}{W_o} \times 100$$

wherein $W_o$ designates a water content of a gel in water; $\rho$ designates a specific gravity of 15 wt.% NaCl aq. (1.111) and W designates a water content of a gel in 15 wt.% NaCl aq. (NaCl+water)

In accordance with the measurement of $W_o$, W was measured except weighing a dry weight of a gel after washing with NaCl aq. and drying it.

As described above, the vinyl pyrrolidone-triallyl isocyanurate copolymer gel obtained in Example 1 had fine pores and had excellent fractioning function to elute proteins in substantially linear to molecular weights and had a hardness capable of separating at a relatively high speed for the fractions in the molecular weight region.

It was further confirmed that the gel had a low shrinkage and substantially no change of a volume in a solution having high ion concentration such as 15% aqueous solution of NaCl. The gel did substantially not adsorb the proteins. When the gel was dipped into a boiled water at 100° C., the gel was not changed to be durable in a sterilization at high temperature.

As a result, it was confirmed that the gel obtained in Example 1 is excellent as a gel for filtration in an aqueous solution.

EXAMPLE 2

In a reactor, a mixture of 50 wt.parts of vinyl pyrrolidone and 3 wt.parts of triallyl isocyanurate was dissolved into 50 wt.parts of water and the mixture was thoroughly mixed and 0.5 ml. of 35% hydrogen peroxide and 0.2 ml. of 29% ammonia were added. The reactor was purged with nitrogen and heated at 60° C. for 16 hours in stand-still. The solidified opaque copolymer gel was obtained. In accordance with the process of Example 1, the gel was post-treated to obtain fine particles. A water content of the gel was 4.5 g water/g. dry resin and a shrinkage of the gel in 15% aqueous solution of NaCl was 4%. The measurements are the same as those of Example 1. The gel was hard not to be crushed by pressing it by a finger.

The gel was packed into the glass chromatography column having an inner diameter of 1.6 cm to be height of the bed of 29.5 cm (a volume of the bed of 59.3 cm$^3$) and various standard proteins were separated into fractions with 1/30 Mol phosphoric acid buffer solution (pH of 7.0) as an eluent.

FIG. 2 shows a characteristic curve of eluted volume to molecular weight. The speed of elution was about 200 cc/hr. In these tests, 1 ml. of 0.1% aqueous solution of each protein was mostly used. The critical molecular weight of the proteins by the gel was about $9 \times 10^4$.

In comparison with the result of Example 1, it was clarified that the critical molecular weight of the protein by the gel can be varied depending upon a ratio of the diluent.

EXAMPLE 3

In a reactor 300 wt.parts of vinyl pyrrolidone, 3 wt.parts of triallyl isocyanurate and 70 wt.parts of dimethylsulfoxide were thoroughly mixed and 0.3 wt.part of $\alpha,\alpha'$-azodiisobutyronitrile was added. The reactor was purged with nitrogen and heated at 60° C. for 16 hours in stand-still. The solidified opaque copolymer gel was obtained. In accordance with the process of Example 1, the gel was post-treated to obtain fine particles. The gel was different from the gels obtained in Examples 1 and 2 but was a transparent gel. A water content of the gel was 2.8 g. water/g. dry resin and a shrinkage of the gel in 15% aqueous solution of NaCl was about 8%. The measurements are the same as those of Example 1.

The gel was packed into the glass chromatography column having an inner diameter of 1.6 cm and various standard proteins were separated. The critical molecular weight of the proteins by the gel was less than $1 \times 10^4$. In comparison with the results of Examples 1 and 2, it was clarified that the critical molecular weight of the proteins by the gel can be controlled depending upon a kind and quantity of the diluent.

EXAMPLE 4

In accordance with the process of Example 1 except using diallyl propargyl cyanurate as the crosslinking agent at the same ratios of vinyl pyrrolidone, the crosslinking agent and dimethylsulfoxide, a copolymer gel was produced.

A preparation of diallyl propargyl cyanurate is described.

In a 500 ml. three necked round bottom flask equipped with a stirrer, 24 g. (0.6 mole) of sodium hydroxide was dissolved in a mixture of 63.3 g. (1.13 mole) of propargyl alcohol and 131.7 g. (2.27 mole) of allyl alcohol, at room temperature and then 36.9 g. (0.2 mole) of cyanuric chloride was added dropwise with thoroughly stirring the reaction mixture so as to maintaining the temperature of 25° to 30° C. for 1.5 hours. After the addition, the reaction was continued at 30° C. for 3.5 hours. After the reaction, the reaction mixture was filtered to separate insoluble materials such as sodium chloride. The filtrate was poured into a large amount of cold water to precipitate the product. The precipitate was dissolved into methanol and the solution was poured into cold water to precipitate the product. The product was recrystallized from isopropanol-water mixture. The resulting diallyl propargyl cyanurate was white crystal having a melting point of 35° C.

In accordance with the process of Example 1, the white opaque gel made of vinyl pyrrolidone-diallyl propargyl cyanurate copolymer was post-treated and pulverized. A water content of the gel was 5.1 g. water/g. dry resin and a shrinkage of the gel in 15% aqueous solution of NaCl was 8.4%. In the test of the elution of various proteins, the critical molecular weight was higher than $4 \times 10^5$.

EXAMPLE 5

In accordance with the process of Example 1 except using triallyl cyanurate instead of triallyl isocyanurate at the same ratios of vinyl pyrrolidone, the crosslinking agent and dimethylsulfoxide, a white solid copolymer gel was produced.

In accordance with the process of Example 1, the gel was post-treated and crushed to be fine particles. A water content of the gel was 4.9 g. water/g. dry resin which was substantially the same as that of Example 1.

The gel was packed in a glass chromatography column having an inner diameter of 1.6 cm to be a volume of the bed of about 60.2 cm³ and various standard proteins were separated. The critical molecular weight of the proteins by the gel was higher than $4 \times 10^5$ as the same as that of Example 1.

We claim:

1. A method for fractionation of a mixture of substances, comprising:
   subjecting said mixture of substances selected from the group consisting of a mixture of vitamins, a mixture of proteins, a mixture of enzymes and mixtures thereof to gel chromatography through a filter bed of a cross-linked copolymer of vinylpyrrolidone and a cross-linking agent obtained by copolymerization of 100 parts by weight of vinylpyrrolidone and 0.5 to 100 parts by weight of said cross-linking agent having a triazine ring system of the formula (I) or (II):

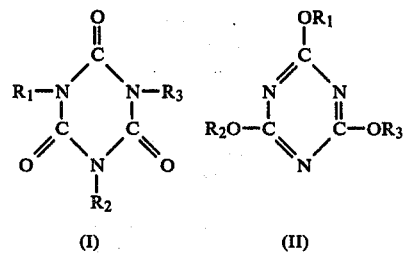

wherein $R^1$, $R^2$ and $R^3$ each are the same or different and are selected from the group consisting of $-CH_2-CH=CH_2$, $-CH_2-C\equiv CH$ and $-CH_2-C(CH_3)=CH_2$ in a diluent.

2. A method for fractionation of a mixture of substances, comprising:
   subjecting a mixture of proteins to gel chromatography through a filter bed of a cross-linked copolymer of vinylpyrrolidone and a cross-linking agent obtained by copolymerization of 100 parts by weight of vinylpyrrolidone and 0.5 to 100 parts by weight of said cross-linking agent having a triazine ring system of the formula (I) or (II):

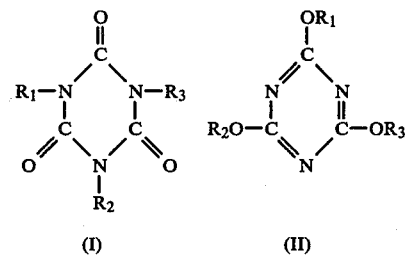

wherein $R^1$, $R^2$ and $R^3$ each are the same or different and are selected from the group consisting of $-CH_2-CH=CH_2$, $-CH_2-C\equiv CH$ and $-CH_2-C(CH_3)=CH_2$ in a diluent.

* * * * *